(12) United States Patent
Huang et al.

(10) Patent No.: US 9,537,627 B2
(45) Date of Patent: *Jan. 3, 2017

(54) SIGNAL TRANSMITTING METHOD AND BASE STATION DEVICE

(71) Applicant: HUAWEI TECHNOLOGIES CO., LTD., Shenzhen, Guangdong (CN)

(72) Inventors: Yinghua Huang, Shanghai (CN); Feng Xing, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/704,439

(22) Filed: May 5, 2015

(65) Prior Publication Data

US 2015/0236827 A1 Aug. 20, 2015

Related U.S. Application Data

(63) Continuation of application No. 13/774,589, filed on Feb. 22, 2013, now Pat. No. 9,048,886, which is a
(Continued)

(51) Int. Cl.
*H04W 72/00* (2009.01)
*H04L 5/00* (2006.01)
*H04W 72/04* (2009.01)

(52) U.S. Cl.
CPC ........ *H04L 5/0035* (2013.01); *H04W 72/0446* (2013.01); *H04W 72/0453* (2013.01)

(58) Field of Classification Search
CPC ............. H04L 5/0035; H04W 72/0446; H04W 72/0453
(Continued)

(56) References Cited

U.S. PATENT DOCUMENTS 8,090,044 B2   1/2012   Rofougaran
8,526,999 B2   9/2013   Nakayama
(Continued)

FOREIGN PATENT DOCUMENTS

CN   101621813 A   1/2010
CN   101777940 A   7/2010
(Continued)

OTHER PUBLICATIONS

Notice of Allowance, dated Feb. 2, 2015, in corresponding U.S. Appl. No. 13/774,589 (10 pp.).
(Continued)

*Primary Examiner* — Mong-Thuy Tran
(74) *Attorney, Agent, or Firm* — Staas & Halsey LLP

(57) ABSTRACT

The present invention provides a signal transmitting method and a base station device. The signal transmitting method is applied to a base station device including a time domain exchanging module and a baseband processing unit, where the time domain exchanging module is connected to the baseband processing unit. The method includes: receiving, by the time domain exchanging module, a first time domain signal transmitted by a user equipment through a radio frequency channel of a serving cell of the user equipment, and receiving a second time domain signal transmitted by the user equipment through a radio frequency channel of a coordinating cell of the user equipment; and transmitting the first time domain signal and the second time domain signal to the baseband processing unit, which is corresponding to the serving cell of the user equipment. Through the present invention, CoMP data exchange can be implemented in an LTE-A system.

11 Claims, 7 Drawing Sheets

A time domain exchanging module receives a first time domain signal transmitted by a first user equipment through a radio frequency channel of a serving cell of the first user equipment, and receives a second time domain signal transmitted by the first user equipment through a radio frequency channel of at least one coordinating cell of the first user equipment  ~101

The time domain exchanging module transmits the first time domain signal and the second time domain signal to a baseband processing unit corresponding to the serving cell of the first user equipment in at least one baseband processing unit  ~102

Related U.S. Application Data continuation of application No. PCT/CN2011/082863, filed on Nov. 24, 2011.

(58) Field of Classification Search
USPC .................. 455/452.1, 456.5; 370/260, 329
See application file for complete search history.

(56) References Cited

U.S. PATENT DOCUMENTS

| | | | |
|---|---|---|---|
| 9,031,032 B2* | 5/2015 | Xiao | 370/328 |
| 9,048,886 B2* | 6/2015 | Huang | H04B 7/024 |
| 2006/0239366 A1 | 10/2006 | Kim et al. | |
| 2007/0002878 A1 | 1/2007 | Moorti et al. | |
| 2007/0258525 A1* | 11/2007 | Jacobsen | H04L 5/023 |
| | | | 375/260 |
| 2008/0146167 A1 | 6/2008 | Rofougaran | |
| 2010/0098014 A1 | 4/2010 | Larsson | |
| 2010/0119003 A1* | 5/2010 | Terabe | H04B 7/022 |
| | | | 375/267 |
| 2010/0272218 A1* | 10/2010 | Yeh | H04B 7/024 |
| | | | 375/330 |
| 2011/0039547 A1 | 2/2011 | van Rensburg et al. | |
| 2011/0280284 A1* | 11/2011 | Nakao | H04J 11/0053 |
| | | | 375/140 |
| 2012/0087427 A1* | 4/2012 | Noh | H04B 7/0613 |
| | | | 375/260 |
| 2012/0114050 A1* | 5/2012 | Osterling | H04B 7/024 |
| | | | 375/259 |
| 2012/0163484 A1* | 6/2012 | Wild | H04L 5/0023 |
| | | | 375/260 |
| 2012/0184322 A1* | 7/2012 | Falconetti | H04W 28/18 |
| | | | 455/524 |
| 2013/0223272 A1* | 8/2013 | Tao | H04B 7/024 |
| | | | 370/252 |

FOREIGN PATENT DOCUMENTS

| | | |
|---|---|---|
| CN | 101778438 A | 7/2010 |
| CN | 101909321 A | 12/2010 |
| EP | 2387268 A1 | 11/2011 |

OTHER PUBLICATIONS

Office Action, dated Sep. 26, 2014, in corresponding U.S. Appl. No. 13/774,589 (9 pp.).

Hoymann, C. et al., *Distributed Uplink Signal Processing of Cooperating Base Stations based on IQ Sample Exchange*, IEEE, 2009 (5 pp.).

Youjun, G. et al., *The Access Network and Protocol Design for CoMP Technique in LTE-Advanced System*, IEEE, 2010 (4 pp.).

Marsch, P. et al., *Field Trial Results on Different Uplink Coordinated Multi-Point (CoMP) Concepts in Cellular Systems*, IEEE, 2010 (6 pp.).

Irmer, R. et al., *Coordinated Multipoint: Concepts, Performance, and Field Trial Results*, IMT-Advanced and Next-Generation Mobile Networks, IEEE Communications Magazine, Feb. 2011, pp. 102-111.

Extended European Search Report, dated Oct. 17, 2013, in corresponding European Application No. 11870171.3 (7 pp.).

International Search Report mailed Aug. 30, 2012 for corresponding International Application No. PCT/CN2011/082863 (10 pp.).

International Search Report mailed Aug. 30, 2012 for corresponding International Application No. PCT/CN2011/082863.

\* cited by examiner

SIGNAL TRANSMITTING METHOD AND BASE STATION DEVICE

CROSS-REFERENCE TO RELATED APPLICATIONS

This application is a continuation of U.S. patent application Ser. No. 13/774,589, filed on Feb. 22, 2013, which is a continuation of International Application No. PCT/CN2011/082863, filed on Nov. 24, 2011. The afore-mentioned patent applications are hereby incorporated by reference in their entireties.

TECHNICAL FIELD

The present invention relates to communications technologies, and in particular, to a signal transmitting method and a base station device.

BACKGROUND

In a long term evolution-advanced (Long Term Evolution-Advanced, hereinafter briefly referred to as LTE-A) system, high data rate coverage may be increased by using a coordinated multi-point transmission/reception (Coordinated Multi-point Transmission/Reception, hereinafter briefly referred to as CoMP) technology, so as to improve cell edge throughput and/or increase system throughput. The so-called CoMP refers to that multiple geographically separated transmission points (which may be understood as different cells) cooperatively participate in data transmission or reception of a user equipment (User Equipment, hereinafter briefly referred to as UE).

The CoMP may be classified into downlink CoMP and uplink CoMP. The downlink CoMP refers to that multiple cells directly or indirectly participate in transmission of downlink data of the same UE. The uplink CoMP refers to that multiple cells simultaneously receive uplink data of the same UE and combine and process the uplink data by using a certain technology. The downlink CoMP is classified into joint processing and coordinated scheduling. The joint processing mode may further be classified into: joint transmission and dynamic cell selection. The joint transmission refers to that multiple cells simultaneously transmit data for a UE through a physical downlink shared channel (Physical Downlink Shared Channel, hereinafter briefly referred to as PDSCH), so as to improve the quality of signals received by the UE and/or eliminate interference from other UEs. The dynamic cell selection refers to that only one cell transmits data for the UE at any time and the cell may be dynamically selected from a CoMP coordination set. In the coordinated scheduling mode, only a serving cell performs scheduling and transmission for the UE, and mutual interference among different UEs may be avoided by coordinating resources among the cells, such as time, frequency, power, space, etc.

During the process of implementing the present invention, the inventor finds that although the LTE-A system supports the CoMP, data exchange between a serving cell and a coordinating cell in the LTE-A system cannot be implemented in the prior art.

SUMMARY

The present invention provides a signal transmitting method and a base station device, so as to implement CoMP data exchange in an LTE-A system.

In one aspect, the present invention provides a signal transmitting method, applied to a base station device including a time domain exchanging module and at least one baseband processing unit, where the time domain exchanging module is separately connected to the at least one baseband processing unit, the method including:

receiving, by the time domain exchanging module, a first time domain signal transmitted by a first user equipment through a radio frequency channel of a serving cell of the first user equipment, and receiving a second time domain signal transmitted by the first user equipment through a radio frequency channel of at least one coordinating cell of the first user equipment; and transmitting, by the time domain exchanging module, the first time domain signal and the second time domain signal to a baseband processing unit corresponding to the serving cell of the first user equipment in the at least one baseband processing unit, so that the baseband processing unit corresponding to the serving cell of the first user equipment in the at least one baseband processing unit obtains frequency domain signals of the first user equipment in the serving cell and the at least one coordinating cell of the first user equipment after performing time-frequency transformation and demapping on the first time domain signal and the second time domain signal.

In another aspect, the present invention provides a base station device, including: a time domain exchanging module and at least one baseband processing unit, the time domain exchanging module being separately connected to the at least one baseband processing unit, where the time domain exchanging module is configured to receive a first time domain signal transmitted by a first user equipment through a radio frequency channel of a serving cell of the first user equipment, and receive a second time domain signal transmitted by the first user equipment through a radio frequency channel of at least one coordinating cell of the first user equipment; and transmit the first time domain signal and the second time domain signal to a baseband processing unit corresponding to the serving cell of the first user equipment in the at least one baseband processing unit; and the baseband processing unit corresponding to the serving cell of the first user equipment in the at least one baseband processing unit is configured to receive the first time domain signal and the second time domain signal that are transmitted by the time domain exchanging module, and obtain frequency domain signals of the first user equipment in the serving cell and the at least one coordinating cell of the first user equipment after performing time-frequency transformation and demapping on the first time domain signal and the second time domain signal.

In the embodiments of the present invention, after receiving the first time domain signal transmitted by the first user equipment through the radio frequency channel of the serving cell of the first user equipment and the second time domain signal transmitted by the first user equipment through the radio frequency channel of the at least one coordinating cell of the first user equipment, the time domain exchanging module transmits the first time domain signal and the second time domain signal to the baseband processing unit corresponding to the serving cell of the first user equipment in the at least one baseband processing unit connected to the time domain exchanging module, so that the baseband processing unit corresponding to the serving cell of the first user equipment in the at least one baseband processing unit obtains the frequency domain signals of the first user equipment in the serving cell and the at least one coordinating cell of the first user equipment after performing time-frequency transformation and demapping on the first time domain signal and the second time domain signal. In this way, data exchange between the serving cell and the coordinating cell may be implemented in the LTE-A system, thereby effectively reducing the influence of interference and improving the quality of radio signals.

BRIEF DESCRIPTION OF DRAWINGS

To illustrate the technical solutions according to the embodiments of the present invention or in the prior art more clearly, accompanying drawings required for describing the embodiments or the prior art are introduced briefly below. Apparently, the accompanying drawings in the following description are merely some embodiments of the present invention, and persons of ordinary skill in the art may further obtain other drawings according to the accompanying drawings without creative efforts.

DESCRIPTION OF EMBODIMENTS

In order to make the objectives, technical solutions, and advantages of the present invention more comprehensible, the following describes the technical solutions according to the embodiments of the present invention with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
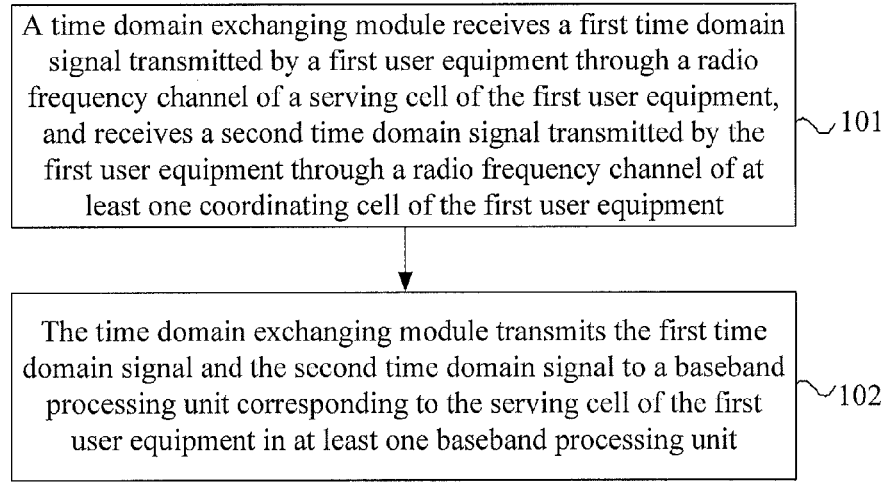
FIG. 1 is a flow chart of an embodiment of a signal transmitting method of the present invention.

FIG. 1 is a flow chart of an embodiment of a signal transmitting method of the present invention. The signal transmitting method provided by this embodiment may be applied to a base station device including a time domain exchanging module and at least one baseband processing unit, where the time domain exchanging module is separately connected to the at least one baseband processing unit.

As shown in FIG. 1, the signal transmitting method may include:

Step 101: The time domain exchanging module receives a first time domain signal transmitted by a first user equipment through a radio frequency channel of a serving cell of the first user equipment, and receives a second time domain signal transmitted by the first user equipment through a radio frequency channel of at least one coordinating cell of the first user equipment.

In this embodiment, when CoMP is performed, at least two cells cooperatively participate in data transmission or reception of a user equipment. The at least two cells are cells coordinating with each other. For the first user equipment, in the at least two cells, at least one cell other than the serving cell of the first user equipment is the at least one coordinating cell of the first user equipment, which is not described again in other embodiments.

Step 102: The time domain exchanging module transmits the first time domain signal and the second time domain signal to a baseband processing unit corresponding to the serving cell of the first user equipment in the at least one baseband processing unit, so that the baseband processing unit corresponding to the serving cell of the first user equipment in the at least one baseband processing unit obtains frequency domain signals of the first user equipment in the serving cell and the at least one coordinating cell of the first user equipment after performing time-frequency transformation and demapping on the first time domain signal and the second time domain signal.

Specifically, the time domain exchanging module may transmit the first time domain signal and the second time domain signal to the baseband processing unit corresponding to the serving cell of the first user equipment according to a preconfigured coordination relationship. In this embodiment, the preconfigured coordination relationship may be configured, by an upper layer (for example, a base station controller), for the time domain exchanging module in the base station device, and the preconfigured coordination relationship may be a signal transmitting relationship in which the first time domain signal transmitted by the first user equipment through the radio frequency channel of the serving cell of the first user equipment and the second time domain signal transmitted by the first user equipment through the radio frequency channel of the at least one coordinating cell of the first user equipment are transmitted to the baseband processing unit corresponding to the serving cell of the first user equipment.

In the above embodiment, after receiving the first time domain signal transmitted by the first user equipment through the radio frequency channel of the serving cell of the first user equipment and the second time domain signal transmitted by the first user equipment through the radio frequency channel of the at least one coordinating cell of the first user equipment, the time domain exchanging module transmits the first time domain signal and the second time domain signal to the baseband processing unit corresponding to the serving cell of the first user equipment in the at least one baseband processing unit connected to the time domain exchanging module, so that the baseband processing unit corresponding to the serving cell of the first user equipment in the at least one baseband processing unit obtains the frequency domain signals of the first user equipment in the serving cell and the at least one coordinating cell of the first user equipment after performing time-frequency transformation and demapping on the first time domain signal and the second time domain signal. In this way, data exchange between the serving cell and the coordinating cell may be implemented in an LTE-A system, thereby effectively reducing the influence of interference and improving the quality of radio signals.

Figure 2:
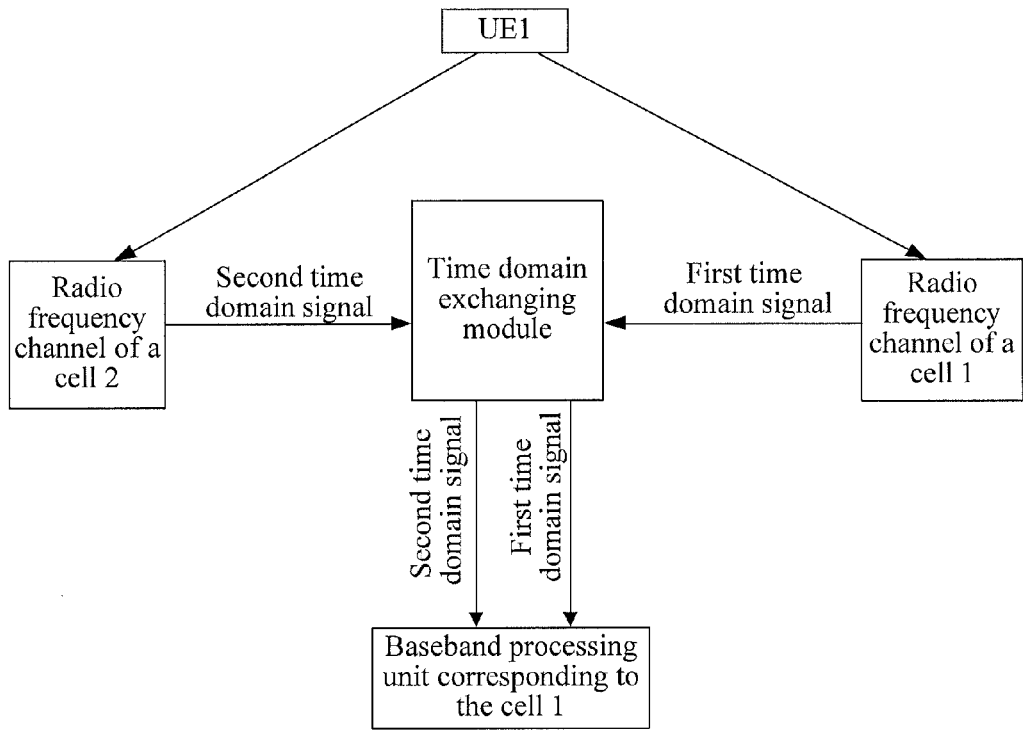
FIG. 2 is a schematic diagram of an embodiment of an application scenario of the present invention.

The method provided by the embodiment shown in FIG. 1 of the present invention may be applied to a scenario shown in FIG. 2. FIG. 2 is a schematic diagram of an embodiment of an application scenario of the present invention.

In FIG. 2, a cell 1 (Cell1) and a cell 2 (Cell2) are cells coordinating with each other. A serving cell of a UE1 is the cell 1, and a coordinating cell is the cell 2. In FIG. 2, a base station device includes a time domain exchanging module and a baseband processing unit corresponding to the cell 1, where the time domain exchanging module is connected to the baseband processing unit corresponding to the cell 1.

Figure 3:
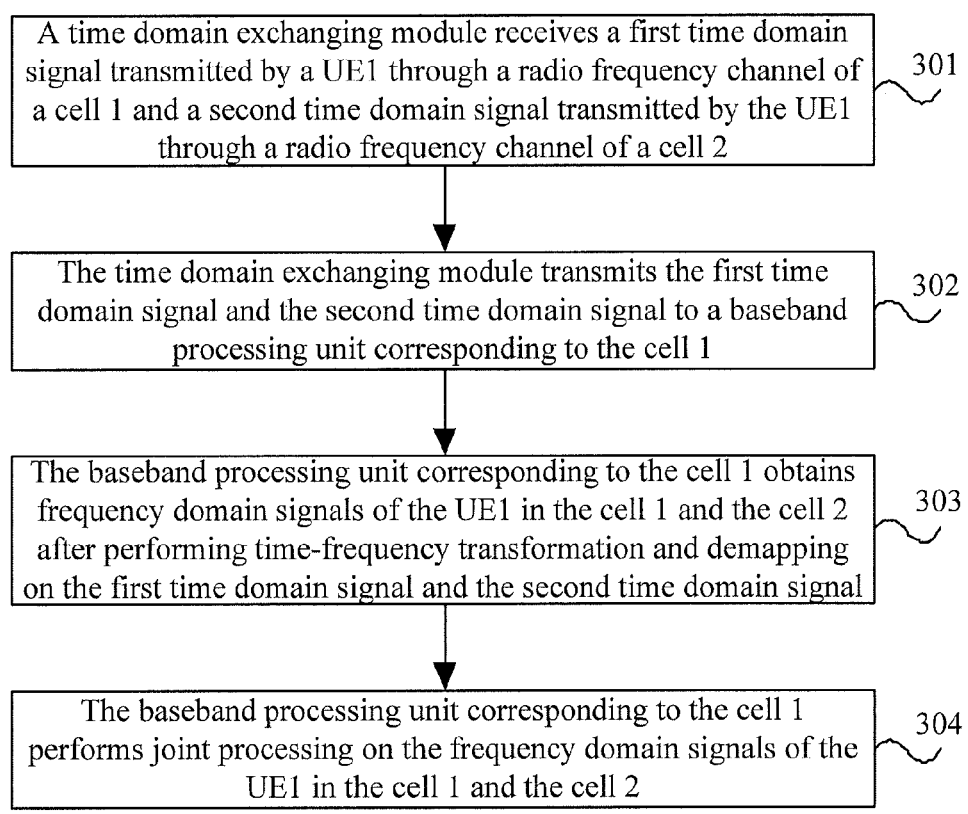
FIG. 3 is a flow chart of another embodiment of a signal transmitting method of the present invention.

FIG. 3 is a flow chart of another embodiment of a signal transmitting method of the present invention. In this embodiment, a CoMP process of the UE1 in FIG. 2 is taken as an example for illustration.

As shown in FIG. 3, the signal transmitting method may include:

Step 301: The time domain exchanging module receives a first time domain signal transmitted by the UE1 through a radio frequency channel of the cell 1 and a second time domain signal transmitted by the UE1 through a radio frequency channel of the cell 2.

Step 302: The time domain exchanging module transmits the first time domain signal and the second time domain signal to the baseband processing unit corresponding to the cell 1.

Specifically, the time domain exchanging module may transmit the first time domain signal and the second time domain signal to the baseband processing unit corresponding to the cell 1 according to a preconfigured coordination relationship.

In this embodiment, the preconfigured coordination relationship may be configured, by an upper layer (for example, a base station controller), for the time domain exchanging module in the base station device, and the preconfigured coordination relationship may be a signal transmitting relationship in which the first time domain signal transmitted by the UE1 through the radio frequency channel of the serving cell of the UE1 and the second time domain signal transmitted by the UE1 through the radio frequency channel of the at least one coordinating cell of the UE1 are transmitted to the baseband processing unit corresponding to the cell 1.

Step 303: The baseband processing unit corresponding to the cell 1 obtains frequency domain signals of the UE1 in the cell 1 and the cell 2 after performing time-frequency transformation and demapping on the first time domain signal and the second time domain signal.

Step 304: The baseband processing unit corresponding to the cell 1 performs joint processing on the frequency domain signals of the UE1 in the cell 1 and the cell 2.

For example, the baseband processing unit corresponding to the cell 1 may first perform multiple input multiple output (Multiple Input Multiple Output, hereinafter briefly referred to as MIMO) decoding and equalization processing on the frequency domain signals of the UE1 in the cell 1 and the cell 2, and then perform processing such as inverse discrete Fourier transform (Inverse Discrete Fourier Transform, hereinafter briefly referred to as IDFT)/demodulation/de-interleaving/hybrid automatic repeat request (Hybrid Automatic Repeat Request, hereinafter briefly referred to as HARQ) combination/decoding/cyclic redundancy check (Cyclic Redundancy Check, hereinafter briefly referred to as CRC).

In specific implementations, in the embodiments shown in FIG. 1 to FIG. 3 of the present invention, the structure of the time domain exchanging module and the physical position of the at least one baseband processing unit may be implemented in different manners.

Figure 4:
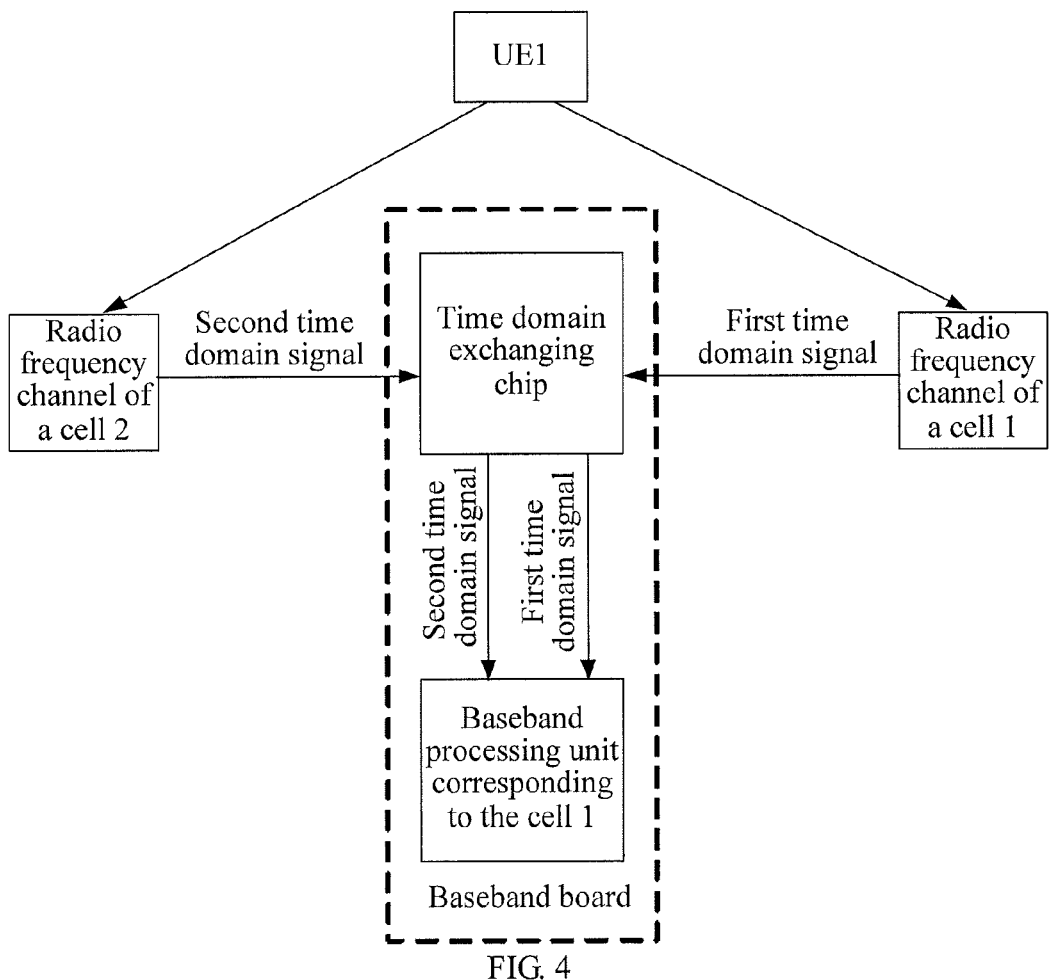
FIG. 4 is a schematic diagram of another embodiment of an application scenario of the present invention.

In an implementation manner of the present invention, the time domain exchanging module and the at least one baseband processing unit may be located on a same baseband board of the base station device. As shown in FIG. 4, FIG. 4 is a schematic diagram of another embodiment of an application scenario of the present invention.

In FIG. 4, a cell 1 and a cell 2 are cells coordinating with each other. A serving cell of a UE1 is the cell 1, and a coordinating cell is the cell 2. In FIG. 4, a base station device includes a time domain exchanging module and a baseband processing unit corresponding to the cell 1, where the time domain exchanging module is a time domain exchanging chip, and the time domain exchanging chip and the baseband processing unit corresponding to the cell 1 are connected to each other, and are located on a same baseband board.

In the scenario shown in FIG. 4, a CoMP process of the UE1 may be obtained with reference to the description of the embodiment shown in FIG. 3 of the present invention, which is not described herein again.

In another implementation manner of the present invention, the time domain exchanging module includes at least two time domain exchanging chips connected to one another, where the at least two time domain exchanging chips are located on different baseband boards in the base station device. In this way, the receiving, by the time domain exchanging module, the first time domain signal transmitted by the first user equipment through the radio frequency channel of the serving cell of the first user equipment, and receiving the second time domain signal transmitted by the first user equipment through the radio frequency channel of the at least one coordinating cell of the first user equipment may be: receiving, by at least one time domain exchanging chip other than a first time domain exchanging chip in the at least two time domain exchanging chips, the second time domain signal transmitted by the first user equipment through the radio frequency channel of the at least one coordinating cell of the first user equipment, and transmitting the second time domain signal to the first time domain exchanging chip, where the first time domain exchanging chip in the at least two time domain exchanging chips and the baseband processing unit corresponding to the serving cell of the first user equipment are located on a same baseband board; and receiving, by the first time domain exchanging chip, the first time domain signal transmitted by the first user equipment through the radio frequency channel of the serving cell of the first user equipment, and receiving the second time domain signal transmitted by the at least one time domain exchanging chip.

In this implementation manner, the transmitting, by the time domain exchanging module, the first time domain signal and the second time domain signal to the baseband processing unit corresponding to the serving cell of the first user equipment in the at least one baseband processing unit may be: transmitting, by the first time domain exchanging chip, the first time domain signal and the second time domain signal to the baseband processing unit corresponding to the serving cell of the first user equipment.

Figure 5:
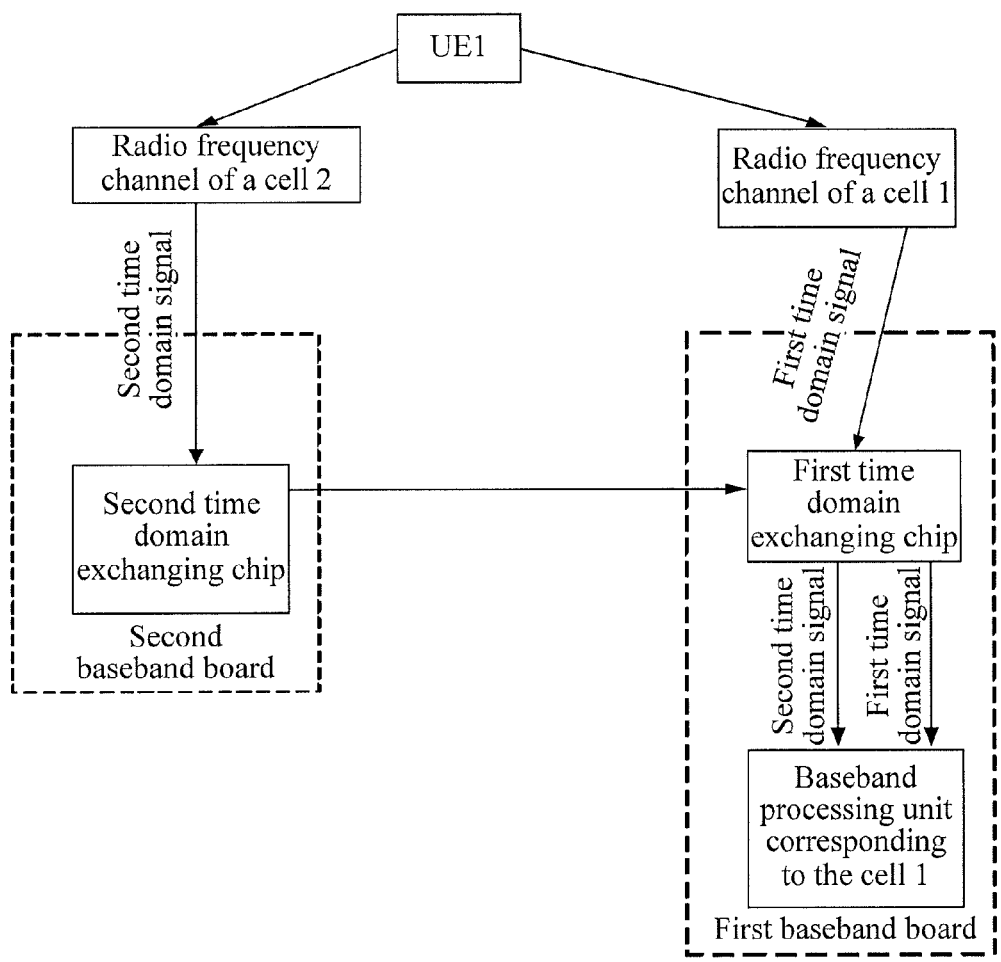
FIG. 5 is a schematic diagram of still another embodiment of an application scenario of the present invention.

FIG. 5 is a schematic diagram of still another embodiment of an application scenario of the present invention. In FIG. 5, a cell 1 and a cell 2 are cells coordinating with each other. A serving cell of a UE1 is the cell 1, and a coordinating cell is the cell 2.

In FIG. 5, a base station device includes a time domain exchanging module and a baseband processing unit corresponding to the cell 1, where the time domain exchanging module is formed by two time domain exchanging chips connected to each other. A first time domain exchanging chip in the two time domain exchanging chips and the baseband processing unit corresponding to the cell 1 are located on a same baseband board (for example, a first baseband board in FIG. 5), and a second time domain exchanging chip in the two time domain exchanging chips is connected to the first time domain exchanging chip, and is located on a baseband board different from the baseband board on which the first time domain exchanging chip is located. In FIG. 5, the second time domain exchanging chip is located on a second baseband board.

Figure 6:
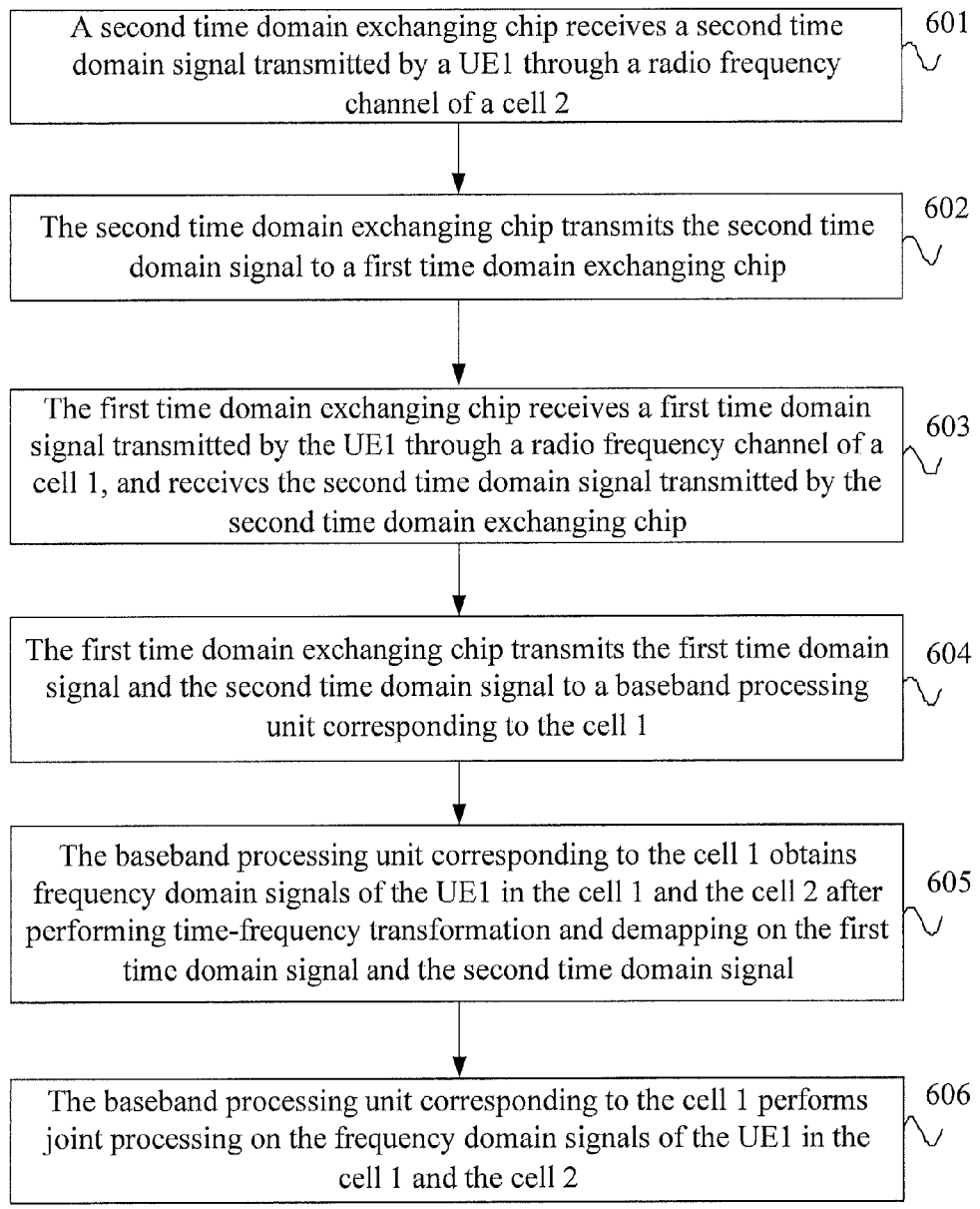
FIG. 6 is a flow chart of still another embodiment of a signal transmitting method of the present invention.

FIG. 6 is a flow chart of still another embodiment of a signal transmitting method of the present invention. In this embodiment, a CoMP process of the UE1 in the scenario shown in FIG. 5 is illustrated.

As shown in FIG. 6, the signal transmitting method may include:

Step 601: The second time domain exchanging chip receives a second time domain signal transmitted by the UE1 through a radio frequency channel of the cell 2.

Step 602: The second time domain exchanging chip transmits the second time domain signal to the first time domain exchanging chip.

Step 603: The first time domain exchanging chip receives a first time domain signal transmitted by the UE1 through a radio frequency channel of the cell 1, and receives the second time domain signal transmitted by the second time domain exchanging chip.

The step in which the first time domain exchanging chip receives the first time domain signal transmitted by the UE1 through the radio frequency channel of the cell 1 and step 601 may be successively performed, and may also be performed in parallel, which is not limited in this embodiment.

Step 604: The first time domain exchanging chip transmits the first time domain signal and the second time domain signal to the baseband processing unit corresponding to the cell 1.

Step 605: The baseband processing unit corresponding to the cell 1 obtains frequency domain signals of the UE1 in the cell 1 and the cell 2 after performing time-frequency transformation and demapping on the first time domain signal and the second time domain signal.

Step 606: The baseband processing unit corresponding to the cell 1 performs joint processing on the frequency domain signals of the UE1 in the cell 1 and the cell 2.

For example, the baseband processing unit corresponding to the cell 1 may first perform MIMO decoding and equalization processing on the frequency domain signals of the UE1 in the cell 1 and the cell 2, and then perform processing such as IDFT/demodulation/de-interleaving/HARQ combination/decoding/CRC.

In still another implementation manner of the present invention, the baseband processing unit corresponding to the serving cell of the first user equipment in the at least one baseband processing unit is located on the first baseband board in the base station device, and the time domain exchanging module is independently set in the base station device, where being independently set refers to that the time domain exchanging module is not set on any baseband board in the base station device. In this implementation manner, the transmitting, by the time domain exchanging module, the first time domain signal and the second time domain signal to the baseband processing unit corresponding to the serving cell of the first user equipment in the at least one baseband processing unit may be:

transmitting, by the time domain exchanging module, the first time domain signal and the second time domain signal to the baseband processing unit that is corresponding to the serving cell of the first user equipment and is located on the first baseband board.

Figure 7:
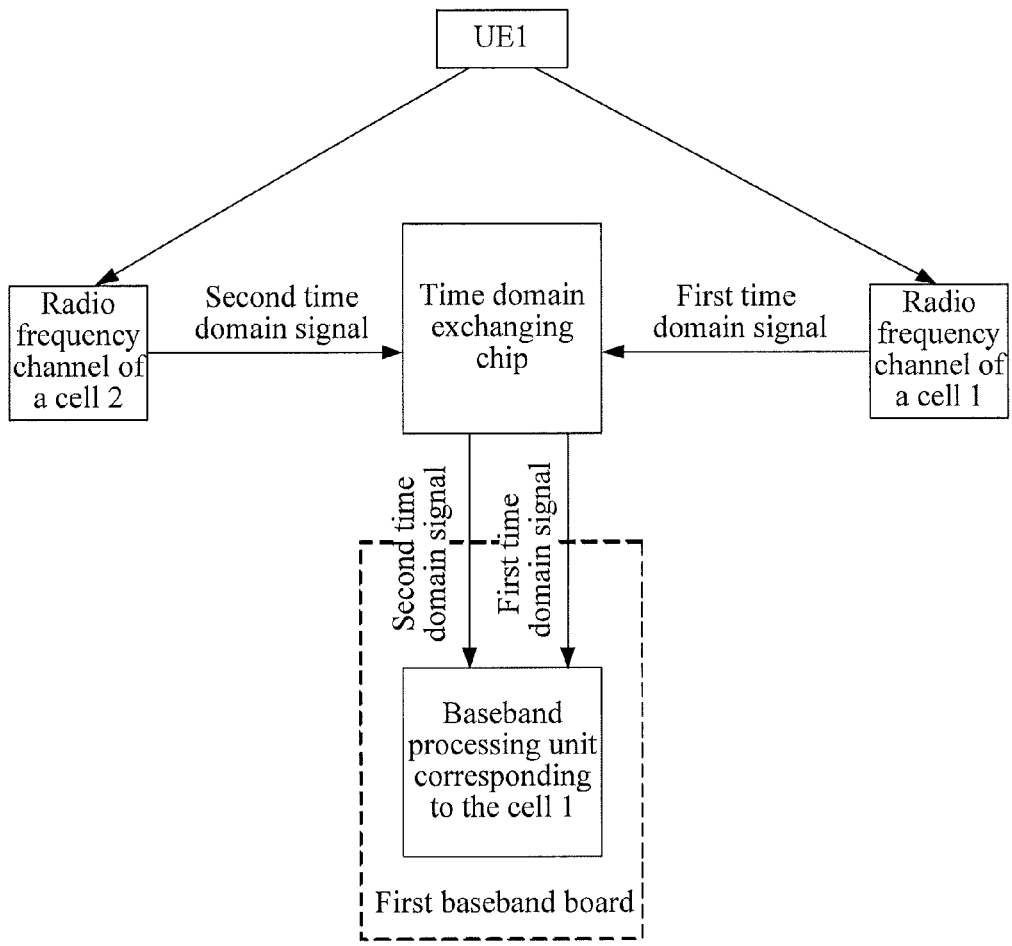
FIG. 7 is a schematic diagram of yet another embodiment of an application scenario of the present invention.

FIG. 7 is a schematic diagram of yet another embodiment of an application scenario of the present invention. In FIG. 7, a cell 1 and a cell 2 are cells coordinating with each other. A serving cell of a UE1 is the cell 1, and a coordinating cell is the cell 2.

In FIG. 7, a base station device includes a time domain exchanging module and a baseband processing unit corresponding to the cell 1, where the time domain exchanging module may be a time domain exchanging chip, and the time domain exchanging chip is independently set in the base station device; and the baseband processing unit corresponding to the cell 1 is located on a first baseband board in the base station device.

In the scenario shown in FIG. 7, after the time domain exchanging chip receives a first time domain signal transmitted by the UE1 through a radio frequency channel of the cell 1 and a second time domain signal transmitted by the UE1 through a radio frequency channel of the cell 2, the time domain exchanging chip may determine, according to a preconfigured coordination relationship, that the first time domain signal and the second time domain signal need to be transmitted to the baseband processing unit corresponding to the cell 1. Then, the time domain exchanging chip may determine, according to a position distribution relationship between baseband processing units and baseband boards that is saved by the time domain exchanging chip, that the baseband processing unit corresponding to the cell 1 is located on the first baseband board. Finally, the time domain exchanging chip transmits the first time domain signal and the second time domain signal to the baseband processing unit that is corresponding to the cell 1 and is located on the first baseband board. The operations performed after the baseband processing unit corresponding to the cell 1 receives the first time domain signal and the second time domain signal may be obtained with reference to the description of step 303 to step 304 of the embodiment shown in FIG. 3 of the present invention, which are not described herein again.

The preconfigured coordination relationship may be configured, by an upper layer (for example, a base station controller), for the time domain exchanging chip. The preconfigured coordination relationship may be a signal transmitting relationship in which the first time domain signal transmitted by the UE 1 through the radio frequency channel of the serving cell of the UE1 and the second time domain signal transmitted by the UE1 through the radio frequency channel of the at least one coordinating cell of the UE1 are transmitted to the baseband processing unit corresponding to the cell 1.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as a ROM, a RAM, a magnetic disk, or an optical disk.

Figure 8:
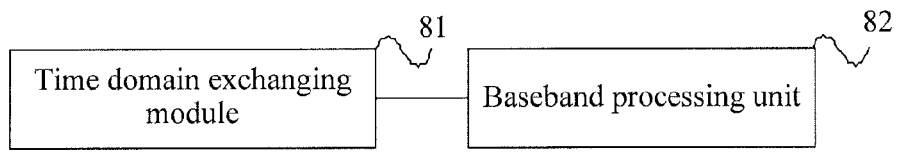
FIG. 8 is a schematic structural diagram of an embodiment of a base station device of the present invention.

FIG. 8 is a schematic structural diagram of an embodiment of a base station device of the present invention, where the base station device in this embodiment may implement the process of the embodiment shown in FIG. 1 of the present invention.

As shown in FIG. 8, the base station device may include: a time domain exchanging module 81 and at least one baseband processing unit 82, the time domain exchanging module 81 being separately connected to the at least one baseband processing unit 82, where the time domain exchanging module 81 is configured to receive a first time domain signal transmitted by a first user equipment through a radio frequency channel of a serving cell of the first user equipment, and receive a second time domain signal transmitted by the first user equipment through a radio frequency channel of at least one coordinating cell of the first user equipment; and transmit the first time domain signal and the second time domain signal to a baseband processing unit corresponding to the serving cell of the first user equipment in the at least one baseband processing unit 82; and the baseband processing unit corresponding to the serving cell of the first user equipment in the at least one baseband processing unit 82 is configured to receive the first time domain signal and the second time domain signal that are transmitted by the time domain exchanging module 81, and obtain frequency domain signals of the first user equipment in the serving cell and the at least one coordinating cell of the first user equipment after performing time-frequency transformation and demapping on the first time domain signal and the second time domain signal.

In this embodiment, the baseband processing unit may be a layer 1 (L1) processing chip.

FIG. 8 shows an example in which the base station device includes one time domain exchanging module 81 and one baseband processing unit 82. At this time, the one baseband processing unit 82 is the baseband processing unit corresponding to the serving cell of the first user equipment.

In the above embodiment, after receiving the first time domain signal transmitted by the first user equipment through the radio frequency channel of the serving cell of the first user equipment, and the second time domain signal transmitted by the first user equipment through the radio frequency channel of the at least one coordinating cell of the first user equipment, the time domain exchanging module 81 transmits the first time domain signal and the second time domain signal to the baseband processing unit corresponding to the serving cell of the first user equipment in the at least one baseband processing unit 82 connected to the time domain exchanging module 81, so that the baseband processing unit corresponding to the serving cell of the first user equipment in the at least one baseband processing unit 82 obtains the frequency domain signals of the first user equipment in the serving cell and the at least one coordinating cell of the first user equipment after performing time-frequency transformation and demapping on the first time domain signal and the second time domain signal. In this way, data exchange between the serving cell and the coordinating cell may be implemented in an LTE-A system, thereby effectively reducing the influence of interference and improving the quality of radio signals.

Figure 9:
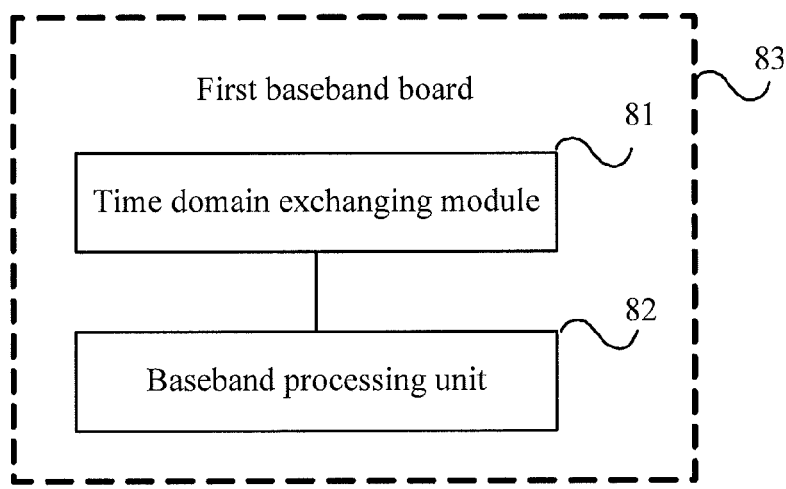
FIG. 9 is a schematic structural diagram of another embodiment of a base station device of the present invention.

FIG. 9 is a schematic structural diagram of another embodiment of a base station device of the present invention. Different from the base station device shown in FIG. 8, in this embodiment, the time domain exchanging module 81 and the at least one baseband processing unit 82 are located on a same baseband board of the base station device. FIG. 9 shows an example in which the base station device includes one time domain exchanging module 81 and one baseband processing unit 82. At this time, the one baseband processing unit 82 is the baseband processing unit corresponding to the serving cell of the first user equipment. As shown in FIG. 9, the time domain exchanging module 81 and the one baseband processing unit 82 are located on a first baseband board 83 in the base station device.

In this embodiment, the time domain exchanging module 81 may be a time domain exchanging chip.

The base station device can implement data exchange between the serving cell and the coordinating cell in an LTE-A system, thereby effectively reducing the influence of interference and improving the quality of radio signals.

Figure 10:
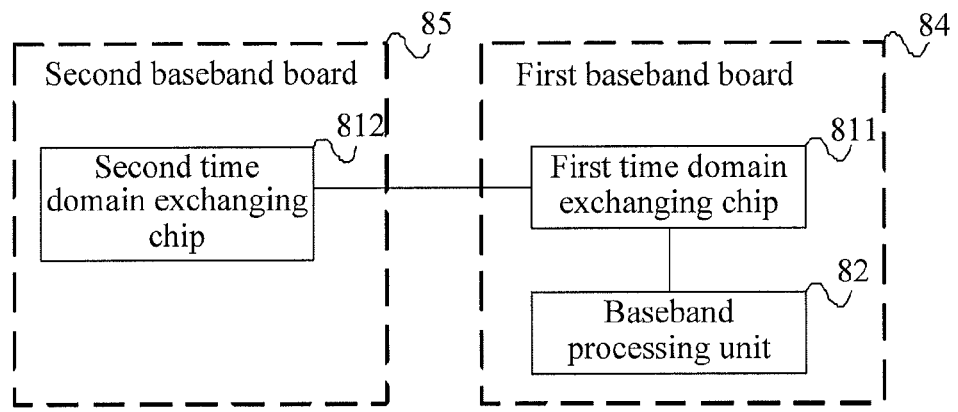
FIG. 10 is a schematic structural diagram of still another embodiment of a base station device of the present invention.

FIG. 10 is a schematic structural diagram of still another embodiment of a base station device of the present invention. Different from the base station device shown in FIG. 8, in this embodiment, the time domain exchanging module may include at least two time domain exchanging chips connected to one another, where the at least two time domain exchanging chips are located on different baseband boards in the base station device, and a first time domain exchanging chip in the at least two time domain exchanging chips and the baseband processing unit corresponding to the serving cell of the first user equipment are located on a same baseband board of the base station device;

at least one time domain exchanging chip other than the first time domain exchanging chip in the at least two time domain exchanging chips is configured to receive a second time domain signal transmitted by a first user equipment through a radio frequency channel of at least one coordinating cell of the first user equipment, and transmit the second time domain signal to the first time domain exchanging chip; and the first time domain exchanging chip is configured to receive a first time domain signal transmitted by the first user equipment through a radio frequency channel of a serving cell of the first user equipment, receive the second time domain signal transmitted by the at least one time domain exchanging chip, and transmit the first time domain signal and the second time domain signal to the baseband processing unit corresponding to the serving cell of the first user equipment.

FIG. 10 shows an example in which the base station device includes one time domain exchanging module 81 and one baseband processing unit 82. At this time, the one baseband processing unit 82 is the baseband processing unit corresponding to the serving cell of the first user equipment. Besides, FIG. 10 shows an example in which the time domain exchanging module 81 includes two time domain exchanging chips connected to each other. In FIG. 10, the two time domain exchanging chips are a first time domain exchanging chip 811 and a second time domain exchanging chip 812.

The first time domain exchanging chip 811 and the baseband processing unit 82 corresponding to the serving cell of the first user equipment are located on a first baseband board 84 in the base station device, and the second time domain exchanging chip 812 is located on a second baseband board 85 in the base station device.

The base station device can implement data exchange between the serving cell and the coordinating cell in an LTE-A system, thereby effectively reducing the influence of interference and improving the quality of radio signals.

Figure 11:
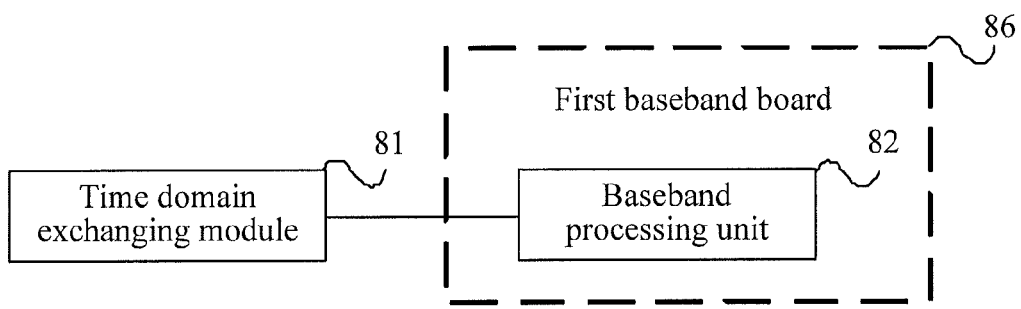
FIG. 11 is a schematic structural diagram of yet another embodiment of a base station device of the present invention.

FIG. 11 is a schematic structural diagram of yet another embodiment of a base station device of the present invention. Different from the base station device shown in FIG. 8, in this embodiment, the baseband processing unit corresponding to the serving cell of the first user equipment in the at least one baseband processing unit is located on a first baseband board in the base station device, and the time domain exchanging module is independently set in the base station device, where being independently set refers to that the time domain exchanging module is not set on any baseband board in the base station device.

In this embodiment, the time domain exchanging module is specifically configured to transmit the first time domain signal and the second time domain signal to the baseband processing unit that is corresponding to the serving cell of the first user equipment and is located on the first baseband board.

FIG. 11 shows an example in which the base station device includes one time domain exchanging module 81 and one baseband processing unit 82. At this time, the one baseband processing unit 82 is the baseband processing unit corresponding to the serving cell of the first user equipment, and the baseband processing unit 82 is located on a first baseband board 86 in the base station device.

In this embodiment, the time domain exchanging module 81 may be a time domain exchanging chip.

The base station device can implement data exchange between the serving cell and the coordinating cell in an LTE-A system, thereby effectively reducing the influence of interference and improving the quality of radio signals.

It should be understood by persons skilled in the art that the accompanying drawings are merely schematic diagrams of an exemplary embodiment, and modules or processes in the accompanying drawings may be not necessarily required in implementing the present invention.

In addition, function units in the embodiments of the present invention may be integrated into a processing unit, or each of the units may exist alone physically, or two or more units are integrated into a unit.

When being implemented in the form of a software function unit and sold or used as a stand-alone product, the functions may be stored in a computer-readable storage medium. Based on such understanding, the essence of the technical solutions of the present invention, or the part that makes contributions to the prior art, or the part of the technical solution may be embodied in the form of a software product. The computer software product may be stored in a storage medium, and incorporates several instructions for instructing a computer device (for example, a personal computer, a server, or a network device) to execute all or part of the steps of the method in any embodiment of the present invention. The storage medium includes any medium that is capable of storing program codes, such as a USB flash drive, a removable hard disk, a read-only memory (Read-Only Memory, and ROM for short), a random access memory (Random Access Memory, and RAM for short), a magnetic disk or an optical disk.

Finally, it should be noted that the embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some or all the technical features in the technical solutions, as long as such modifications or replacements do not depart from the scope of the technical solutions of the embodiments of the present invention.

What is claimed is:

1. A base station device, applied to a communication system, in which a serving cell and a coordinating cell cooperatively participate in data transmission or reception of a user equipment (UE), wherein the base station device comprises
    a baseband processing unit corresponding to the serving cell; and
    a first time domain exchanging chip connected with the baseband processing unit, configured to receive a first time domain signal transmitted by the UE through a radio frequency channel of the serving cell; and
    a second time domain exchanging chip coupled to the first time domain exchanging chip, configured to receive a second time domain signal transmitted by the UE through a radio frequency channel of the coordinating cell and transmit the second time domain signal to the first time domain exchanging chip, wherein, the first time domain exchanging chip is further configured to receive the second time domain signal and transmit the first time domain signal and the second time domain signal to the baseband processing unit; wherein
    the baseband processing unit is configured to receive the first time domain signal and the second time domain signal, perform time-frequency transformation and demapping on the first time domain signal and the second time domain signal to obtain frequency domain signals of the UE in the serving cell and the coordinating cell, and jointly process the frequency domain signals of the UE.

2. The device according to claim 1, wherein the first time domain exchanging chip is configured to transmit the first time domain signal and the second time domain signal to the baseband processing unit according to a preconfigured coordination relationship.

3. The device according to claim 2, wherein the preconfigured coordination relationship is a signal transmitting relationship in which the first time domain signal and the second time domain signal are transmitted to the baseband processing unit.

4. The device according to claim 1, wherein the first time domain exchanging chip and the baseband processing unit are located on a same baseband board of the base station device.

5. The device according to claim 1, wherein the first time domain exchanging chip and the second time domain exchanging chip are located on different baseband boards in the base station device.

6. A signal transmitting method, applied to a communication system, in which a serving cell and a coordinating cell cooperatively participate in data transmission or reception of a user equipment (UE), wherein the method is performed by a base station device, and the base station device comprises a baseband processing unit corresponding to the serving cell, a first time domain exchanging chip connected with the baseband processing unit, and a second time domain exchanging chip connected with the first time domain exchanging chip, and the method comprises:
    receiving, by the first time domain exchanging chip, a first time domain signal transmitted by the UE through a radio frequency channel of the serving cell;
    receiving, by the second time domain exchanging chip, a second time domain signal transmitted by the UE through a radio frequency channel of the coordinating cell, and transmitting the second time domain signal to the first time domain exchanging chip;

transmitting, by the first time domain exchanging chip, the first time domain signal and the second time domain signal to the baseband processing unit;

receiving, by the baseband processing unit, the first time domain signal and the second time domain signal; performing time-frequency transformation and demapping on the first time domain signal and the second time domain signal to obtain frequency domain signals of the UE in the serving cell and the coordinating cell; and jointly processing the frequency domain signals of the UE.

7. The method according to claim 6, wherein transmitting, by the first time domain exchanging chip, the first time domain signal and the second time domain signal to the baseband processing unit, comprises:

transmitting, by the first time domain exchanging chip, the first time domain signal and the second time domain signal to the baseband processing unit according to a preconfigured coordination relationship.

8. The method according to claim 7, wherein the preconfigured coordination relationship is a signal transmitting relationship in which the first time domain signal and the second time domain signal are transmitted to the baseband processing unit.

9. The method according to claim 6, wherein the first time domain exchanging chip and the baseband processing unit are located on a same baseband board of the base station device.

10. The method according to claim 6, wherein the first time domain exchanging chip and the second time domain exchanging chip are located on different baseband boards in the base station device.

11. A communication system, comprising a base station device and a user equipment (UE), wherein a serving cell and a coordinating cell cooperatively participate in data transmission or reception of the UE, wherein the base station device comprises a baseband processing unit corresponding to the serving cell, a first time domain exchanging chip connected with the baseband processing unit, and a second time domain exchanging chip connected with the first time domain exchanging chip, wherein, the first time domain exchanging chip is configured to receive a first time domain signal transmitted by the UE through a radio frequency channel of the serving cell;

the second time domain exchanging chip is configured to receive a second time domain signal transmitted by the UE through a radio frequency channel of the coordinating cell, and transmit the second time domain signal to the first time domain exchanging chip;

the first domain exchanging chip is further configured to transmit the first time domain signal and the second time domain signal to the baseband processing unit; and the baseband processing unit is configured to receive the first time domain signal and the second time domain signal, perform time-frequency transformation and demapping on the first time domain signal and the second time domain signal to obtain frequency domain signals of the UE in the serving cell and the coordinating cell, and jointly process the frequency domain signals of the UE.

* * * * *